Dec. 4, 1962    H. M. MUIR    3,067,320
METHOD FOR JOINING TANTALUM SHEETS
Filed Nov. 18, 1958

INVENTOR.
HUBERT M. MUIR
BY
ATTORNEYS

United States Patent Office 3,067,320
Patented Dec. 4, 1962

3,067,320
METHOD FOR JOINING TANTALUM SHEETS
Hubert M. Muir, North Hollywood, Calif., assignor to Nuclear Corporation of America, New York, N.Y., a corporation of Delaware
Filed Nov. 18, 1958, Ser. No. 774,757
3 Claims. (Cl. 219—118)

This invention relates to a method for joining tantalum sheets or foils and, more particularly, is connected with the manufacture of containers made from tantalum sheets.

Metallic tantalum has been used more and more frequently because of its many unique properties which include its high melting point and ductility combined with a great resistance to attack by a large number of chemicals. Even at relatively high temperatures, tantalum has a very low solubility point with many reacting metals. It therefore constitutes an ideal container material for e.g. highly purified metals, especially the rare earth metals. However, in order to produce containers from tantalum sheets, welding steps must be performed and heretofore it has been quite difficult to obtain satisfactory welds of tantalum, since deformation, oxidation and other metallurgical changes occur which impair the quality of the welds. Especially with thin foils, burn through constitutes a serious problem arising from lack of power control at the low power factor required for these foils. Unsatisfactory welds are, furthermore, presumably caused by the absorption of various gases, unless the weld area is properly protected. Special techniques have been developed which include e.g. immersion in water or carbon tetrachloride during the welding operation. Another method for welding tantalum foils has been suggested which requires a completely inert atmosphere, an elaborate welding chamber of jigs, special electrodes requiring frequent adjustment and a relatively skilled operator to produce acceptable welds.

It has been found that tantalum sheets can be joined to give flawless welds when operating in the normal atmosphere, i.e. without protection, by using a capacitor-discharge welding equipment. This term, as used hereinafter, is understood to encompass welding equipment in which the discharge current of a capacitor or a capacitor bank is utilized to perform the welding operation. It is assumed that, due to the brief welding time as compared to the commonly applied methods, the aforementioned shortcomings and side effects are eliminated. Tests revealed that tantalum foils can be welded by means of capacitor-discharge welding equipment in the normal atmosphere, i.e. without protecting atmosphere, to obtain flawless welds and pressure-tight seams, provided that the welds are spaced sufficiently close to each other to obtain overlapping. The new method has been developed to permit the manufacture of e.g. tantalum containers in about half the time, as compared to that required heretofore, whereby the welding can be performed by comparatively inexperienced operators and without the use of an inert atmosphere, jig, chamber, etc.

The invention will be further illustrated by reference to the accompanying drawing in which.

Figure 1:
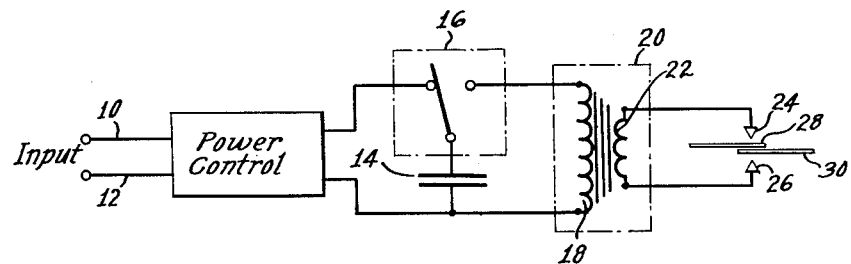
FIGURE 1 is a schematic diagram of a capacitor-discharge welding equipment.

In accordance with the invention tantalum sheets or foils, especially for the production of containers, are joined by means of a capacitor-discharge welding equipment. This type of resistance welding machine or apparatus is well known in the art and a detailed description of such a device is omitted herein. For use in connection with the manufacture of containers from tantalum sheets having a thickness ranging from 0.001 inch to 0.010 inch, a type of hand tweezer welding equipment has been found suitable. A schematic diagram of this well known equipment is shown in FIGURE 1. The current required is drawn from a current source by the leads 10 and 12, and supplied by a power control to a capacitor 14 when a switch 16 is in the position shown in FIGURE 1. By throwing the switch into its other position, the capacitor 14 discharges through the primary winding 18 of a transformer 20 and is thereby disconnected from the power supply. An extremely short current impulse is induced in the secondary winding 22 of the transformer 20 which current impulse is supplied to the welding electrodes 24 and 26 to perform a spot weld between the tantalum sheets 28 and 30. Suitably, tungsten electrodes having a diameter of $1/16$ of an inch are used which form part of the hand operated tweezer. The latter is furthermore provided with means for adjusting the applied pressure. Likewise, the switch 16 is mounted in the tweezer-type hand piece for convenience of the operator.

When carrying out the method of the invention, at first the proper power input rating for the thickness of the sheet to be welded must be selected. Good results have been obtained when using from about 5 watt-seconds to about 45 watt-seconds input power and an optimum has been found with about 10 watt-seconds input for foils of 0.001 inch thickness and 35 watt-seconds for foils of 0.005 inch thickness. Corresponding electrode pressures to insure a homogeneous spot weld range from 0.5 to 10 pounds when the electrodes have a diameter of about one-sixteenth of an inch. From the foregoing specific examples it will be apparent that applicant's process includes the steps of subjecting a weld area A of a tantalum sheet of a thickness between 0.001 and 0.010 inch to a contact pressure of between 160 and 3,300 pounds per square inch. A welding energy of between $0.5 \times 10^6$ and $2.1 \times 10^6$ watt-seconds per cubic inch of the volume of tantalum $2tA$ is applied.

Figure 2:
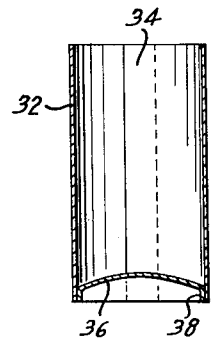
FIGURE 2 is a sectional view of a cylindrical tantalum container.
Figure 3:
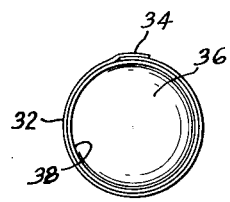
FIGURE 3 is a bottom view of FIGURE 2.

In order to produce a container from tantalum sheet, commonly in the shape of a cylinder, a rectangular sheet 32 is bent, suitably around a cylindrical mandrel until the edges overlap each other to form a tubular body as shown in FIGURES 2 and 3. Subsequently, the overlapping edges forming a strip-shaped area 34 are united by means of the described welding equipment whereby a pressure-tight seam is obtained when spacing the welds along the strip sufficiently close to each other so that each weld overlaps the area of at least two adjacent welds. The formation of pressure-tight welded seams in this fashion or by other, similar means is well known in the art. A circular, cup-shaped, bottom portion 36 is prepared from tantalum sheet, e.g. by means of a die, inserted into the cylindrical body portion 32 as shown in FIGURE 2 whereupon the rim 38 of the bottom portion is joined to the adjacent wall of the cylinder 32 by a welding step similar to that described hereinbefore. After filling the container, a second, identical bottom portion is welded into the other end of the cylinder 32, if desired, or the container may remain open depending on the purpose thereof. Since the welds obtained are capable of resisting temperatures to 2000° C., the containers have been successfully used for melting rare earth metals therein.

Figure 4:
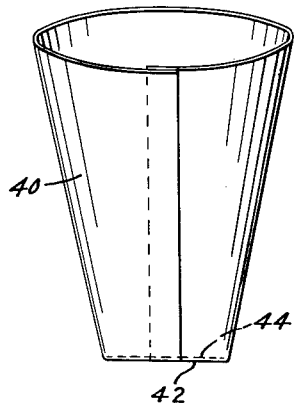
FIGURE 4 is a perspective view of a modified container.

Another type of a container shown in FIGURE 4 is obtained from a conical body portion 40 produced by bending a trapezoidal sheet around a conical mandrel and flattening one end thereof until the circular opening is transformed into two substantially straight edges 42 and 44 contacting each other and joining the edges by means of the capacitor-discharge welding equipment.

It will be obvious to those skilled in the art that many more modifications may be made within the scope of the present invention without departing from the spirit thereof, and the invention includes all such modifications.

What is claimed is:

1. A method of capacitor discharge welding of tantalum sheets of a thickness $t$ including the steps of subjecting the weld area A to a contact pressure between 160 and 3300 pounds per square inch and supplying energy between $0.5 \times 10^6$ and $2.1 \times 10^6$ watt-seconds per cubic inch of the volume of tantalum $2tA$.

2. A method of capacitor discharge welding tantalum sheets of a thickness $t$ including the steps of subjecting a weld area A of the order of magnitude of 0.003 square inch to a contact pressure between 160 and 3300 pounds per square inch and supplying a welding energy between $0.5 \times 10^6$ and $2.1 \times 10^6$ watt-seconds per cubic inch of the volume of tantalum $2tA$.

3. A method of capacitor discharge welding tantalum sheets of a thickness $t$ between 0.001 and 0.010 inch including the steps of subjecting the weld area A to a contact pressure between 160 and 3300 pounds per square inch and supplying a welding energy between $0.5 \times 10^6$ and $2.1 \times 10^6$ watt-seconds per cubic inch of the volume of tantalum $2tA$.

References Cited in the file of this patent

UNITED STATES PATENTS

| | | |
|---|---|---|
| 1,176,614 | Stanley | Mar. 21, 1916 |
| 2,287,540 | Vang | June 23, 1942 |